Nov. 11, 1969   J. H. ROGERS   3,477,214
ROTOR ASSEMBLY FOR A SHREDDER IMPLEMENT
Filed Oct. 24, 1965
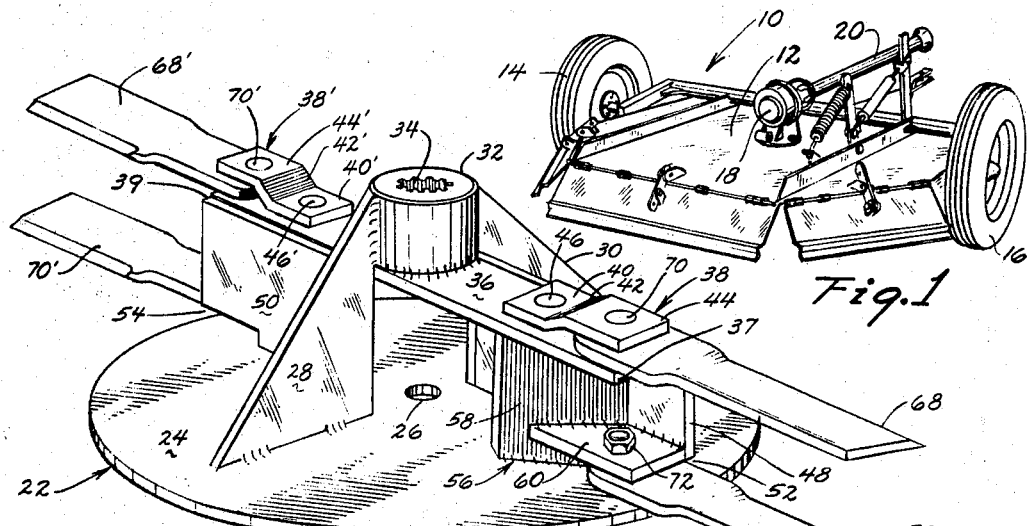
Fig. 1
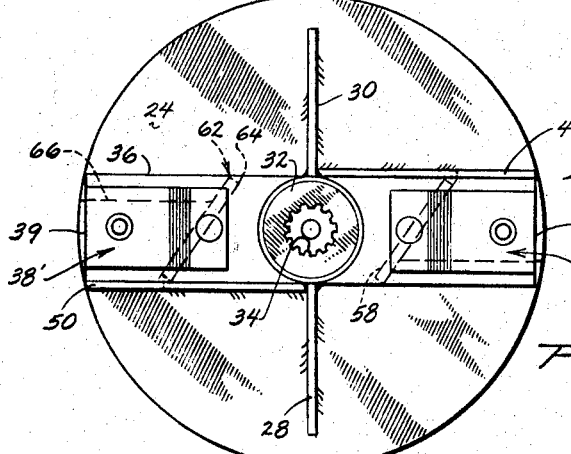
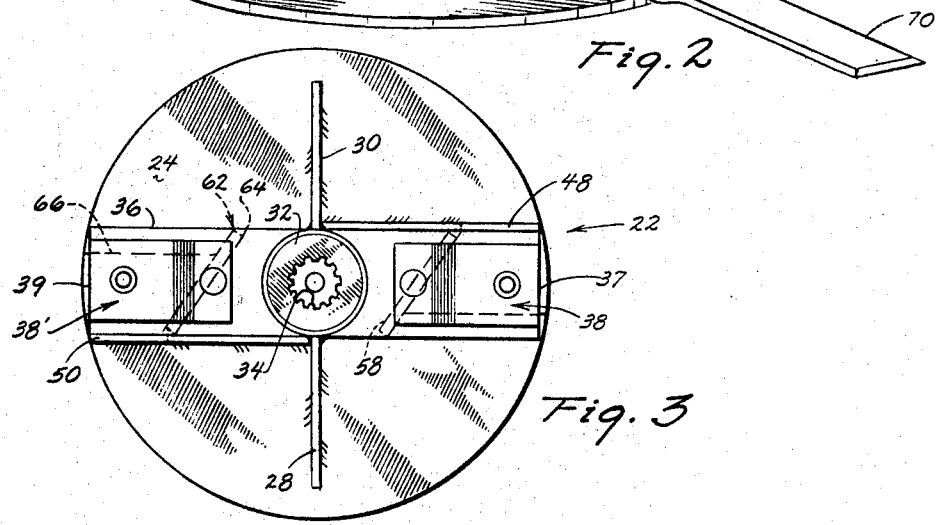
Fig. 2
Fig. 3
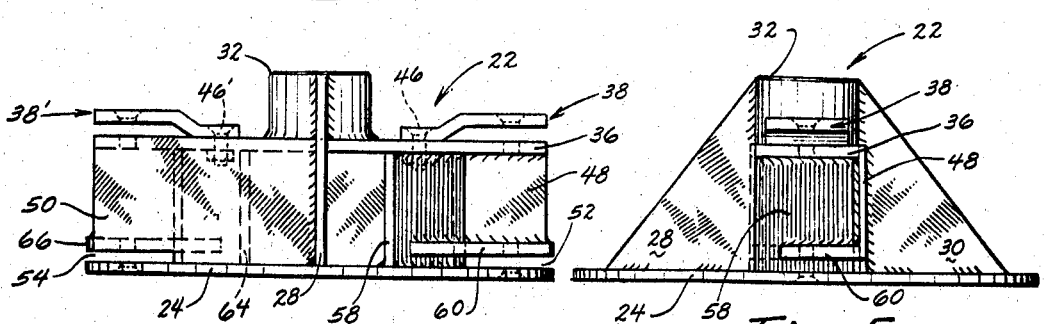
Fig. 4
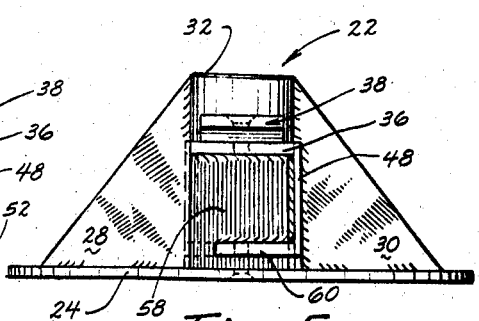
Fig. 5
INVENTOR.
*JOHN HARLAN ROGERS*
BY
*Dick, Zarley, McKee & Thomte*
ATTORNEYS

United States Patent Office 3,477,214
Patented Nov. 11, 1969

3,477,214
ROTOR ASSEMBLY FOR A SHREDDER IMPLEMENT
John Harlan Rogers, Fort Dodge, Iowa, assignor to The Standard Engineering Company, Fort Dodge, Iowa
Filed Oct. 24, 1965, Ser. No. 504,854
Int. Cl. A01d 55/18, 55/28
U.S. Cl. 56—295                                              10 Claims

ABSTRACT OF THE DISCLOSURE

A rotor assembly for a shredder implement adapted for cutting and shredding cornstalks, grass or the like. A cutting blade support means is secured to and supported above a flat, circular, horizontally disposed buffer plate which is operatively connected to a vertically disposed power driven shaft. The cutting blade support means supports the cutting blades in a plane above the buffer plate.

---

The conventional shredder implements consist generally of a cutting blade assembly rotatably mounted below a horizontally disposed frame means. The cutting blade assembly of the conventional shredder implements are not provided with any means of protection therefor. When the shredder implement passes over or engages an uneven ground surface, the cutting blade assembly engages the ground surface and causes the cutting blades thereof to dig into the ground with resultant damage thereto.

Therefore, it is a principal object of this invention to provide a rotor assembly for a shredder implement which prevents damage to the cutting blade assembly thereof.

It is a further object of this invention to provide a rotor assembly for a shredder implement having a buffer plate positioned below the cutting blades.

A further object of this invention is to provide a rotor assembly for a shredder implement which "rides over" any uneven ground surface.

A further object of this invention is to provide a rotor assembly for a shredder implement which prevents the cutting blades thereof from engaging the ground.

A further object of this invention is to provide a rotor assembly for a shredder implement which prevents clogging of material therein.

A further object of this invention is to provide a rotor assembly for a shredder implement which prevents damage to the cutting blade assembly.

A further object of this invention is to provide a rotor assembly for a shredder implement which is adapted to have a plurality of cutting blades quickly and easily detachably secured thereto.

A futher object of this invention is to provide a rotor assembly for a shredder implement which is durable in use, refined in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the shredder implement on which the rotor assembly of this invention is mounted;
FIG. 2 is a perspective view of the rotor assembly;
FIG. 3 is a top elevational view of the rotor assembly;
FIG. 4 is a side elevational view of the rotor assembly; and FIG. 5 is a side elevational view of the rotor assembly as would be seen from the right in FIG. 4.

In FIG. 1, the shredder implement is referred to generally by the reference numeral 10. Implement 10 includes a frame 12 supported by wheels 14 and 16 at the sides thereof. A gear assembly 18 is mounted on the top of frame 12 and is connected to the power take-off unit 20 extending therefrom to a tractor or the like. Gear assembly 18 includes a rotatable power driven shaft (not shown) extending vertically downwardly therefrom through frame 12. The power driven shaft is splined for a portion of its length and has reduced diameter portion at its lower end.

The rotor assembly of this invention is referred to generally by the reference numeral 22. The numeral 24 generally designates a horizontally disposed, flat, circular buffer plate having a circular opening 26 formed therein at the center thereof. As best seen in FIGS. 2, 3 and 5, a pair of oppositely disposed reinforcing plates 28 and 30 are secured to the upper surface of plate 24 by welding and extend upwardly therefrom. A cylindrical hub 32 is secured to the upper ends of reinforcing plates 28 and 30 by means of welding and extends therebetween. Hub 32 is provided with a bore 34 extending therethrough which is provided with a series of alternate grooves and ridges. Bore 34 is in vertical alignment with opening 26 in plate 24. As seen in FIGS. 2 and 4, a top rotor bar 36 is secured at the center of its length to the lower end of hub 32 by means of welding or the like. The longitudinal axis of rotor bar 36 extends transversely to reinforcing plates 28 and 30. As best seen in FIG. 3, the opposite ends of rotor bar 36 terminate in a substantially vertical plane with the periphery of plate 24.

For purposes of description, rotor bar 36 will be described as having opposite ends 37 and 39.

A cutting blade mounting bracket 38 including a base portion 40, an inclined portion 42 extending upwardly and outwardly from the outer end of base portion 40 and a horizontal portion 44 extending horizontally outwardly from the upper outer end of inclined portion 42, is secured to rotor bar 36 at end 37 by means of a bolt assembly 46 extending through base portion 40 and bar 36.

A cutting blade bracket 38' including a base portion 40', and inclined portion 42' extending upwardly and outwardly from the outer end of base portion 40' and a horizontal portion 44' extending horizontally outwardly from the upper end of inclined portion 42', is secured to rotor bar 36 at end 39 by means of a bolt assembly 46' extending through base portion 40' and bar 36.

An upstanding support member 48 is secured at its lower end to the upper surface of plate 24 by welding and is secured at its upper end to a side edge of bar 36 by welding. As best seen in FIG. 3, a support member 48 extends from reinforcing plate 30 to the end 37 of rotor bar 36. An upstanding support member 50 is secured at its lower end to the upper surface of plate 24 by welding and is secured at its lower end to the upper surface of plate 24 by welding and is secured at its upper end to the other side edge of rotor bar 36. As best seen in FIG. 3, support member 50 extends from reinforcing plate 28 to the end 39 of rotor bar 36.

As seen in FIG. 4, support member 48 is provided with a horizontal notch 52 extending thereinto from its lower outer end. As also best seen in FIG. 4, support member 50 is provided with a horizontal notch 54 extending thereinto at its lower outer end. The numeral 56 generally designates a cutting blade supporting bracket at end 37 of bar 36 including a base portion 58 welded to support member 48, the upper surface of plate 24 and the lower surface of bar 36 and also including a horizontally extending ledge portion 60 welded to base portion 58 and support member 48. As best seen in FIGS. 2 and 3, base portion 58 is disposed at an angle with respect to the longitudinal axis of bar 36. The numeral 62 generally designates a cutting blade supporting bracket at end 39 of bar 36 and includes a base portion 64 welded to support member 50, the upper surface of plate 24 and the lower surface of bar 36 and also includes a horizontally extending ledge portion 66 welded to base portion 64 and support member 50. As best seen in FIG. 3, base portion 64 is disposed at an angle with respect to the longitudinal axis of bar 36.

As shown in FIG. 2, the numeral 68 generally designates a cutting blade which is swingably secured at its inner end between horizontal portion 44 of bracket 38 and bar 36 by means of bolt assembly 70 extending therethrough. The inner end of cutting blade 68 is rounded to prevent the engagement of its inner end with inclined portion 42 of bracket 38. A cutting blade 68' is also swingably secured at its inner end between horizontal portion 44' of bracket 38' and bar 36 by means of bolt assembly 70' extending therethrough. The inner end of cutting blade 58' is rounded to prevent engagement thereof with inclined portion 44' of bracket 38'.

The numeral 70 generally designates a cutting blade which is swingably secured at its inner end between ledge portion 60 and plate 24 by means of bolt assembly 72 extending therethrough. The inner end of cutting blade 70 is also rounded to permit the cutting blade to freely swing about bolt assembly 72 without its inner end engaging base portion 58. Cutting blade 70 is adapted to swingably move through notch 52 at times.

The numeral 70' generally designates a cutting blade which is swingably secured at its inner end between ledge portion 66 and plate 24 by means of a bolt assembly extending therethrough. The inner end of cutting blade 70' is also rounded for the reasons given heretofore. Cutting blade 70' is adapted to swing through notch 54 in support member 50 at times.

Rotor assembly 22 is operatively secured to the shaft extending downwardly from gear assembly 18 so that the splined portion of the shaft is received by bore 34 of hub 32 and the reduced diameter portion at the lower end of the shaft is received by opening 26 in buffer plate 24. The lower end of the shaft is operatively secured to buffer plate 24 by any convenient means such as by a pin means, nut means, welding or the like.

The normal method of operation is as follows. Power take-off unit 20 and gear assembly 18 are utilized to selectively cause the rotation of rotor assembly 22 and cutting blade 68, 68', 70 and 70'. The swingable attachment of these blades to rotor assembly 22 permits the cutting blades to swing away from an obstruction struck thereby to prevent damage to the blades.

If an obstruction, such as a mound or ridge of dirt, should pass beneath the shredder implement, the rotating buffer plate 24 will engage the obstruction and rotatably slide thereover. The fact that buffer plate 24 rotatably slides over the obstruction causes the rotor assembly and the cutting blades thereon to be moved upwardly which also causes frame 12 of the shredder implement to also be slightly moved upwardly. Because the buffer plate 24 causes the rotor assembly and the cutting blades thereon to be moved upwardly upon engagement with an obstruction, the cutting blades are prevented from digging into the obstruction and thereby prevents damage from occurring thereto. In effect then, buffer plate 24 comes between the obstruction and the cutting blades and serves as buffer means. It should be noted that all of the cutting blades previously described are positioned in a plane above buffer plate 24 to permit the buffer plate to come between any obstruction and the cutting blades.

Support members 48 and 50 serve as a means of preventing material from becoming clogged in the rotor assembly due to their being positioned at the leading edge of the rotating bar 36.

The rounded inner ends of the cutting blades permits the cutting blades to be freely swingably secured to the rotor assembly and notches 52 and 54 also aid in permitting the free swingable movement of cutting blades 70 and 70'.

Thus it can be seen that the rotor assembly of this invention permits quick attachment of cutting blades thereto, prevents damage to the cutting blades, and is non-clogging.

Thus it can be seen that the device accomplishes at least all of its stated objectives.

Some changes may be made in the construction and arrangement of my rotor assembly for a shredder implement without departing from the real spirit and purpose of my invention.

I claim:

1. In a rotor assembly for a shredder implement,
   a flat, circular, horizontally disposed buffer plate having an upper surface,
   a cutting blade support means operatively secured to and spaced above the upper surface of said buffer plate,
   said cutting blade support means being adapted to support cutting blades in a plane above said buffer plate,
   and connection means operatively secured to said buffer plate adapted to removably receive a vertically disposed power driven rotatable shaft to cause rotation of said buffer plate and said cutting blade support means when the power driven shaft is rotated,
   said cutting blade support including a pair of spaced apart, oppositely disposed plate members secured to the upper surface of said buffer plate and extending upwardly therefrom, a hub portion secured to and extending between the upper ends of said plate members adapted to be operatively connected to the power driven shaft of the shredder implement and having a lower end spaced above said buffer plate; an elongated top rotor bar secured at its center to the lower end of said hub portion; the opposite ends of said top rotor bar each being adapted to have a cutting blade operatively secured thereto; a first bottom rotor bar operatively secured to said buffer plate and spaced upwardly therefrom below one of the ends of said top rotor bar; a second bottom rotor bar operatively secured to said buffer plate and spaced upwardly therefrom below the other end of said top rotor bar; said first and second bottom rotor bars each being adapted to have a cutting blade operatively secured thereto.

2. The rotor assembly of claim 1 wherein opposite ends of said top rotor bar and said first and second bottom rotor bars are each adapted to have a cutting blade swingably secured thereto.

3. The rotor assembly of claim 1 wherein said buffer plate has an aperture formed therein at the center thereof which registers with said hub portion to permit the power driven shaft to be extended through said hub portion and said aperture so that the power driven shaft may be operatively secured to said hub portion and said buffer plate.

4. The rotor assembly of claim 1 wherein said first and second bottom rotor bars each have inner and outer ends and wherein a first upstanding supporting member is secured to the inner end of said first bottom rotor bar and said top rotor bar; a second upstanding supporting member secured to the inner end of said second bottom rotor bar and said top rotor bar; said first and second upstanding supporting members each being angularly disposed with respect to the longitudinal axis of said top rotor bar.

5. In a rotor assembly for a shredder implement,
   a flat, circular, horizontally disposed buffer plate having an upper surface, a cutting blade support means operatively secured to and spaced above the upper surface of said buffer plate, said cutting blade support means being adapted to support cutting blades in a plane above said buffer plate, and connection means operatively secured to said buffer plate adapted to removably receive a vertically disposed power driven rotatable shaft to cause rotation of said buffer plate and said cutting blade support means when the power driven shaft is rotated, said cutting blade support means including a top rotor bar having opposite ends and which is operatively secured to and spaced above the upper surface of said buffer plate, the opposite ends of said top rotor bar each being adapted to swingably receive a cutting blade; said cutting blade support means also including means adapted to support a cutting blade means below said top rotor bar and above said buffer plate, the opposite ends of said top rotor bar each having a cutting blade support bracket secured thereto; each of said cutting blade support brackets including a base portion secured to the upper portion of said top rotor bar, an inclined portion extending upwardly and outwardly from said base portion, and a horizontal portion extending outwardly from the upper end of said inclined portion; said top rotor bar and the horizontal portion of each of said brackets being adapted to swingably receive one end of a cutting blade therebetween.

6. In a rotor assembly for a shredder implement, a flat, circular, horizontally disposed buffer plate having upper and lower surfaces, a cutting blade support means secured to the upper surface of said buffer plate, first and second pairs of vertically spaced cutting blades secured to said cutting blade support means, and connection means operatively secured to said buffer plate adapted to removably receive a vertically disposed power driven rotatable shaft to cause rotation of said buffer plate and said cutting blade support means when the power driven shaft is rotated.

7. The rotor assembly of claim 6 wherein said cutting blade support means is adapted to swingably receive the cutting blades.

8. The rotor assembly of claim 6 wherein said cutting blade support means includes a top rotor bar having opposite ends which is operatively secured to and spaced above the upper surface of said buffer plate, the opposite ends of said top rotor bar each being adapted to swingably receive a cutting blade; said cutting blade support means also including means adapted to support a cutting blade means below said top rotor bar and above said buffer plate.

9. The rotor assembly of claim 6 wherein said cutting blade support means includes an elongated top rotor bar having opposite ends and opposite sides and which is operatively secured to and spaced above the upper surface of said buffer plate; the center of said top rotor bar being positioned above the center of said buffer plate, said top rotor bar having a leading edge at each end thereof outwardly of its center, and wherein a wall member is secured to and extends between each leading edge and said buffer plate to prevent clogging of the rotor assembly.

10. The rotor assembly of claim 9 wherein the wall member at each leading edge has a notch formed therein to receive a cutting blade swingably extending thereinto at times.

References Cited

UNITED STATES PATENTS

| | | | |
|---|---|---|---|
| 2,654,986 | 10/1953 | Gold | 56—295 |
| 2,939,264 | 6/1960 | Kontis | 56—295 |
| 3,086,346 | 4/1963 | Zimmermann | 56—295 X |
| 2,697,322 | 12/1954 | Watrous | 56—295 |
| 2,815,631 | 12/1957 | Northcote et al. | |

FOREIGN PATENTS

| | | |
|---|---|---|
| 250,673 | 4/1964 | Australia. |

HUGH R. CHAMBLEE, Primary Examiner